(12) United States Patent
Waugh

(10) Patent No.: US 10,878,335 B1
(45) Date of Patent: Dec. 29, 2020

(54) SCALABLE TEXT ANALYSIS USING PROBABILISTIC DATA STRUCTURES

(71) Applicant: Amazon Technologies, Inc., Seattle, WA (US)

(72) Inventor: Robert Mark Waugh, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1084 days.

(21) Appl. No.: 15/182,366

(22) Filed: Jun. 14, 2016

(51) Int. Cl.
*G06N 20/00* (2019.01)
*G06F 40/205* (2020.01)
*G06F 3/023* (2006.01)
*G06F 16/242* (2019.01)

(52) U.S. Cl.
CPC ........... *G06N 20/00* (2019.01); *G06F 3/0237* (2013.01); *G06F 40/205* (2020.01); *G06F 16/2433* (2019.01)

(58) Field of Classification Search
CPC ........ G06N 20/00; G06N 20/20; G06N 20/10; G06F 17/27; G06F 17/2705; G06F 17/271; G06F 17/2715; G06F 17/2765; G06F 17/2809; G06F 17/2836; G06F 3/0237; G06F 40/205; G06F 16/2433
USPC ..................................................... 706/12, 21
See application file for complete search history.

(56) References Cited

U.S. PATENT DOCUMENTS

| 7,930,322 B2 | 4/2011 | MacLennan | |
|---|---|---|---|
| 2001/0027408 A1 | 10/2001 | Nakisa | |
| 2007/0244738 A1 | 10/2007 | Chowdhary et al. | |
| 2008/0077451 A1 | 3/2008 | Anthony et al. | |
| 2008/0097937 A1 | 4/2008 | Hadjarian | |
| 2009/0171662 A1 | 7/2009 | Huang et al. | |
| 2013/0238584 A1* | 9/2013 | Hendry | G06F 17/273 707/706 |
| 2014/0156567 A1* | 6/2014 | Scholtes | G06N 5/02 706/12 |
| 2014/0297267 A1* | 10/2014 | Spencer | G06F 17/276 704/9 |
| 2016/0110343 A1* | 4/2016 | Kumar Rangarajan Sridhar | G06F 17/2715 704/9 |
| 2016/0328388 A1* | 11/2016 | Cao | G06F 16/3347 |

OTHER PUBLICATIONS

Ying Zhao, et al., "Empirical and Theoretical Comparisons of Selected Criterion Functions for Document clustering*"", Machine Learning, 55, 2004, pp. 311-331.
Shi Zong, et al., "Generative Model-based Document Clustering: A Comparative Study", Knowledge and Information Systems, 8(3), 2005, pp. 374-384.

(Continued)

*Primary Examiner* — Shane D Woolwine

(74) *Attorney, Agent, or Firm* — Robert C. Kowert; Kowert, Hood, Munyon, Rankin & Goetzel, P.C.

(57) ABSTRACT

A mapping function is used to identify one or more entries of a probabilistic data structure to be updated to indicate a presence of a particular term in a text record. Some entries of the data structure may correspond to more than one term. The data structure is used as input for a machine learning algorithm which provides an indication of similarity between the text record and other text records.

20 Claims, 9 Drawing Sheets

(56) References Cited

OTHER PUBLICATIONS

Charles Elkan, "Clustering Documents with an Exponential-Family Approximation of the Dirichlet Compound Multinomial Distribution", In Proceedings of the 23rd International Conference on Machine Learning, ACM, Jun. 2006, pp. 289-296.

Inderjit S. Dhillon, et al., "Concept Decompositions for Large Sparse Text Data using Clustering", Machine Learning, 42(1-2), 2001, pp. 143-175.

Inderjit S. Dhillon, et al., "A Divisive Information-Theoretic Feature Clustering Algorithm for Text Classification", Journal of Machine Learning Research 3, 2003 pp. 1265-1287.

Noam Slonim, et al., "Document Clustering using Word Clusters via the Information Bottleneck Method," In Proceedings of the 23rd annual international ACM SIGIR conference on Research and development in information retrieval, Jul. 2000, pp. 208-215.

Inderjit S. Dhillon, et al., "Information Theoretic Clustering of Sparse Co-Occurrence Data", In Proceedings of the Third IEEE International Conference on Data Mining (ICDM'03), Nov. 2003, pp. 517-520.

Arindam Banerjee, et al., "Clustering on the Unit Hypersphere using von Mises-Fisher Distributions", In Journal of Machine Learning Research 6, 2005, pp. 1345-1382.

Graham Cormode, et al., "Sketching Probabilistic Data Streams", In Proceeding of the 2007 ACM SIGMOD International Conference on Management of Data, ACM, Jun. 2007, pp. 281-292.

Moses Charikar, et al., "Finding Frequent Items in Data Streams", In Automata, Languages and Programming, 2002, pp. 693-703.

Graham Cormode, et al., "An improved data stream summary: the count-min sketch and its applications", Journal of Algorithms, 2005, pp. 58-75.

Tian Zhang, et al., "BIRCH: An Efficient Data Clustering Method for Very Large Databases", In ACM SIGMOD '96, vol. 25, No. 2, Jun. 1996, pp. 103-114.

David Arthur, et al., "k-means++: The Advantages of Careful Seeding", In Proceedings of the Eighteenth Annual ACM-SIAM Symposium on Discrete Algorithms, Society for Industrial and Applied Mathematics, Jan. 2007, pp. 1027-1035.

Noga Alon, et al., "The space complexity of approximating the frequency moments", Downloaded from URL: http://www.cse.unsw.edu.au/~cs9314/07s1/lectures/Lin_CS9314_References/space_compexity.pdf, Feb. 22, 2002, pp. 1-19.

Graham Cormode, et al., "Approximating Data with the Count-Min Data Structure", IEEE, Aug. 12, 2011, pp. 1-9.

Graham Cormode, "Sketch Techniques for Approximate Query Processing", Foundations and Trends in Datatbases, NOW Publishers, 2011, pp. 1-64.

"Amazon Machine Learning Developer Guide", Amazon Web Services, Apr. 9, 2015, pp. 1-128.

"Amazon Machine Learning API Reference", Amazon Web Services, API Version, Dec. 12, 2014, pp. 1-124.

U.S. Appl. No. 14/460,163, filed Aug. 14, 2014, Zuohua Zhang.

U.S. Appl. No. 14/489,448, filed Sep. 17, 2014, Leo Parker Dirac, et al.

U.S. Appl. No. 14/460,312, filed Aug. 14, 2014, Leo Parker Dirac, et al.

U.S. Appl. No. 14/318,880, filed Jun. 30, 2014, Leo Parker Dirac, et al.

U.S. Appl. No. 14/319,902, filed Jun. 30, 2014, Leo Parker Dirac, et al.

U.S. Appl. No. 14/460,314, filed Aug. 14, 2014, Leo Parker Dirac, et al.

U.S. Appl. No. 14/463,434, filed Aug. 19, 2014, Robert Matthias Steele, et al.

U.S. Appl. No. 14/569,458, filed Dec. 12, 2014, Leo Parker Dirac, et al.

U.S. Appl. No. 14/489,449, filed Sep. 17, 2014, Leo Parker Dirac, et al.

U.S. Appl. No. 14/484,201, filed Sep. 11, 2014, Michael Brueckner, et al.

U.S. Appl. No. 14/538,723, filed Nov. 11, 2014, Polly Po Yee Lee, et al.

U.S. Appl. No. 14/923,237, filed Oct. 26, 2015, Leo Parker Dirac, et al.

U.S. Appl. No. 14/935,426, filed Nov. 8, 2015, Gowda Dayananda Anjaneyapura Range, et al.

U.S. Appl. No. 14/990,171, filed Jan. 7, 2016, Gourav Roy et al.

U.S. Appl. No. 14/990,161, filed Jan. 7, 2016, Gourav Roy et al.

AWS, "Amazon Machine Learning Developer Guide", API, Apr. 9, 2015, pp. 1-133.

Hinrich Schutze, et al., "A Comparison of Classifiers and Document Representations for the Routing Problem," Proceeding: SIGIR '95 Proceedings of the 18th annual international ACM SIGIR conference on Research and development in information retrieval, pp. 229-237, ACM New York, NY, USA © 1995.

"Amazon CloudWatch: Developer Guide," API Version Aug. 1, 2010, Amazon Web Services, Inc., pp. 1-360.

From Wikipedia, the free encyclopedia, "Bloom Filter," downloaded from https://en.wikipedia.org/wiki/Bloom_filter#Examples on Apr. 27, 2016, pp. 1-17.

Flavio Bonomi, et al., "An Improved Construction for Counting Bloom Filters," Y. Azar and T. Erlebach (Eds.): ESA 2006, LNCS 4168, pp. 684-695, 2006, Springer-Verlag Berlin Heidelberg 2006.

Aapo Hyvärinen, "Survey on Independent Component Analysis,"Neural Computing Surveys 2, 94-128, 1999, http://ww.icsi.berkeley.edu/~jagota/NCS.

Christian S. Perone, Terra Incognita,"Machine Learning :: Text feature extraction (tf-idf)—Part I," Sep. 18, 2011, pp. 1-25, downloaded from http://blog.christianperone.com/2011/09/machinelearningtextfeatureextractiontfidfparti/.

Christian S. Perone, Terra Incognita,"Machine Learning: Text feature extraction (ff-idf)—Part II," Mar. 10, 2011, pp. 1-32, downloaded from http://blog.christianperone.com/2011/10/machinelearningtextfeatureextractiontfidfpartii/.

Lindsay I Smith, "A tutorial on Principal Components Analysis," Feb. 26, 2002, Publisher John Wiley & Sons Inc, ISBN 0-471-85223-6, pp. 1-27.

Roweis and Saul, "Nonlinear Dimensionality Reduction by Locally Linear Embedding," Science Vole 290, Dec. 22, 2000, pp. 1-5.

Noam Slonim, et al., "Unsupervised Document Classification using Sequential Information Maximization," SIGIR'02, Aug. 11-15, 2002, Tampere, Finland. Copyright 2002 ACM 1-58113-561-0/02/0008, pp. 1-8.

Sumologic.com, Sumo Logic Overview: Next-Generation Log Management & Analytics: Next-Generation Machine Data Analytics, downloaded from https://www.sumologic.com/resource/datasheet/sumologicoverviewnextgenerationlogmanagementanalytics/ on Apr. 27, 2016, pp. 1-10.

Kumar Saurabh, "What the heck is LogReduce," Mar. 23, 2012, Sumo Logic, downloaded from https://www.sumologic.com/2012/03/23/whattheheckislogreduce/, pp. 1-8,.

\* cited by examiner

SCALABLE TEXT ANALYSIS USING PROBABILISTIC DATA STRUCTURES

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In large-scale computing environments, such as various cloud-based networks, machine learning techniques may sometimes be applied to the contents of log records, e.g., to troubleshoot or avoid various types of problem states, to provide insights into resource usage trends which can in turn help with capacity planning, and so on. Log records may be generated at various levels of the hardware/software stacks being used, such as at the operating system layer, the virtualization management layer (if virtual machines are being used), the application layer, networking intermediary devices and the like to provide information about various events and/or the state of hardware or software components. Within a log record, at least a subset of the logged information may often be stored as unstructured text.

In many text-focused machine learning applications including log analysis, one of the high-level objectives may be to identify similarities among groups of text records, e.g., using clustering or other unsupervised learning methodologies. In some large-scale computing environments, text data may be generated at very high rates (e.g., in the case of log analysis, at the rate of millions of text records per second at some data centers). Each record's text may in turn contain dozens or hundreds of individual words or terms. Many machine learning techniques for text analysis rely on determining and storing the frequencies of occurrence of individual terms within the text records. This can result in matrices (or other data structures for representing the occurrence frequencies) of very high dimensionality.

Dimensionality reduction techniques such as principal component analysis may be used to transform the term occurrence frequency information, with the reduced-dimension version of the data being used as input for classification and/or other machine learning models. The time (and resources) consumed for dimensionality reduction may typically increase with the number of dimensions of the raw occurrence frequency data (and, of course, with the number of text records). Unfortunately, at least in some cases, the dimensionality of the raw occurrence frequency data may be so high that it may not be possible to generate analyses of high-volume text data within desired time frames.

Figure 1:
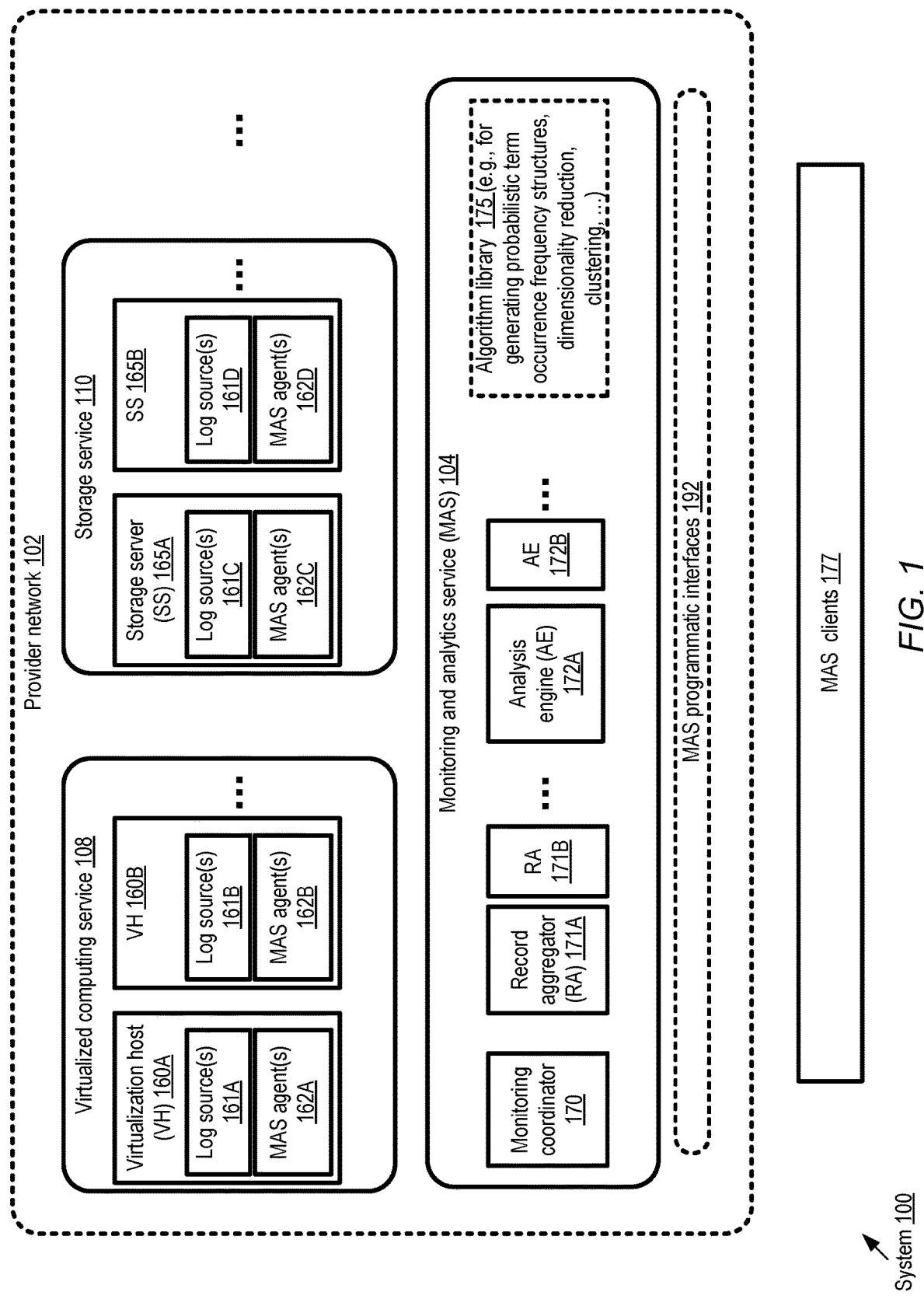
FIG. 1 illustrates an example system environment in which probabilistic data structures may be generated from text records for machine learning applications, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for scalable machine learning-based analysis of text data using probabilistic data structures are described. In at least some embodiments, the scalable text analysis techniques may be implemented at an analytics service of a provider network. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries.

A resource monitoring service which enables clients to track the usage and status of various provider network resources (such as virtual or physical machines of a computing service, storage devices of a storage service, database instances of a database service and the like) allocated to the clients may be implemented at some provider networks in some embodiments. In some such embodiments, the scalable text analysis algorithms described herein may be utilized by an analytics component of the resource monitoring service for processing log records collected from various resources, or by a machine learning service (also implemented at the provider network) invoked by the resource monitoring service to process such log records. In other embodiments, the scalable text analysis techniques may be implemented at computing devices which are not necessarily associated with, or part of, a network-accessible service or a provider network—for example, the techniques may be used at a client's private network or data center. Although the techniques are discussed in the context of log record processing in much of the following description, the techniques may be applied to any text analysis environment, and more generally to various machine learning application environments with high-dimensional input data sets in which approximate (rather than exact) results are an acceptable tradeoff for faster analysis.

For many machine learning methodologies involving unstructured text, data structures representing the occurrence counts or frequencies of various words or terms of the text are generated as an intermediate step. For example, for a text data set of N text records, and T distinct terms or words among all the text records, an N×T matrix may be created, with the element (p, q) of the matrix indicating that the $q^{th}$ word occurred in the $p^{th}$ record (or indicating the number of occurrences of the $q^{th}$ word in the $p^{th}$ record). The dimensionality (number of columns, corresponding to the number of distinct terms being tracked) of such a matrix may be very high for many text data sets. Furthermore, a dictionary that maps the distinct terms to their positions within the matrix may also grow very large. In at least some cases, the high-dimensional matrix may first be transformed into a smaller data structure via a dimensionality reduction algorithm, and the reduced-dimension version of the information may then be used for subsequent stages of machine learning such as classification and the like. As the volume of the raw text that has to be analyzed increases, and as the overall number of distinct text terms increases, the amount of resources and time required for storing the raw term occurrence data and reducing its dimensionality may quickly grow large enough to make real-time (or near-real-time) analysis of the data very difficult. In an environment such as a monitoring and analytics service of a large provider network, where hundreds of thousands or millions of log records may have to be processed and classified over very short time intervals, conventional approaches to text processing may not suffice.

Accordingly, in at least some embodiments, a technique that includes generating approximate or probabilistic data structures for text term occurrence information may be employed. The amount of storage and/or processing required may be reduced in such techniques compared to at least some conventional approaches in which exact counts of term frequencies are generated. The reduction in resource usage may be accompanied by a (typically slight) reduction in the exactness of the results in at least some embodiments. Because of the probabilistic nature of the algorithm, some amount of term-confusion may be introduced, as discussed below—e.g., a given entry in a probabilistic data structure may represent occurrences or counts more than one term. By choosing parameters of the algorithm appropriately, the extent of term-confusion may be kept within reasonable bounds in various implementations. As discussed below, in some embodiments, parameter values for the algorithm may be selected at least partly on the basis of a desired maximum term-confusion threshold. The probabilistic representations of the text term occurrence information may be provided as input to further stages of a machine learning pipeline, e.g., to a dimensionality reduction algorithm which in turn generates output that can be used as input for classification or other machine learning models. The generation of the probabilistic data structures may thus represent an early stage of a multi-stage analysis procedure in at least some embodiments, in which input data is transformed to reduce the resource consumption of the subsequent stages.

In one embodiment, a component of a text analysis system, implemented at one or more computing devices (e.g., at an analytics service of a provider network) may obtain a collection or sequence of text-containing data records generated at one or more data sources. The data sources may include, for example, various log-producing entities associated with resources of a provider network, such as operating systems at hardware servers or virtual machines, virtualization management components including hypervisors, user-mode applications, networking intermediary devices such as load balancers, routers, gateways and the like. A given received data record may comprise one or more text terms. The text may be "cleansed" or normalized in a preliminary step in some embodiments, e.g., by converting all the tokens to upper case or lower case for uniformity, removing punctuation and "stop-words" (words such as "a", "and" or "the" in the case of English which are typically not very meaningful for analysis purposes), word stemming, lemmatization and the like. The types of operations performed for cleansing may, of course, differ based on the language used—e.g., the set of stop words or even the kinds of punctuation symbols removed may be different for English than for Spanish or French. In at least one embodiment the pre-processing of the records may include automated language translation—e.g., log records in various languages may be translated to a single language prior to further analysis.

Using one or more hashing-based transformation functions, one or more entries of a probabilistic data structure (such as a matrix in which a given column does not necessarily correspond to a single term) that are to be updated to represent a given term of a given data record may be identified. Such transformation functions may also be referred to as mapping functions herein. In some embodiments, multiple hash functions may be used, while in other embodiments, a single hash function may be used. The identified entries may be modified in different ways in various embodiments—e.g., in some embodiments, each entry may comprise a single bit which is to be set to 1 to indicate the presence of the term, while in other embodiments each entry may comprise a k-bit integer which is incremented to indicate the presence of the term. In various embodiments, a given entry of the probabilistic data structure may represent the occurrence or count of several different terms. In at least one embodiment, a given entry of the probabilistic data structure may represent the occurrence or count of several different terms within more than one record of the set of data records being analyzed.

The probabilistic data structure, although smaller than an exact data structure for term occurrences or counts, may still comprise a large number of dimensions or columns in some embodiments. The probabilistic data structure may therefore be used as input to a dimensionality-reduction algorithm in at least some embodiments. A number of different approaches towards dimensionality reduction may be employed in different embodiments. For example, algorithms such as principal component analysis, independent component analysis, the information bottleneck algorithm, locally linear embedding, nonnegative matrix factorization, probabilistic latent semantic analysis, or the like may be used. The output produced by the dimensionality-reduction algorithm in turn may be used as input for a classification algorithm or other unsupervised or supervised machine learning models in some embodiments. In some embodiments, dimensionality reduction may not be required, and the probabilistic data structures may be used as the input to classification or other models without an intervening dimensionality reduction step. The combination of one or more algorithms executed on the probabilistic data structures in the multi-stage machine learning methodology may be referred to as the "post-probabilistic-transformation" algorithms herein. The results of the overall multi-stage machine learning methodology (e.g., an indication of a particular class into which a particular text record was placed as a result of the analysis) may be provided via a programmatic interface to a client of the text analysis system. Because of the term confusion introduced by the hashing-related approximation, some errors may be introduced into the results in various embodiments. In at least one embodiment, error-correcting techniques may be applied before providing the results to clients as discussed below.

In some implementations, depending for example of the particular post-probabilistic-transformation algorithms being employed, the probabilistic data structures may be processed iteratively or in a batch mode. Each time that entries corresponding to N new data records have been updated in the probabilistic data structures, for example, the subsequent stages of the machine learning procedure (such as dimensionality reduction, classification etc.) may be implemented for the updated data structures. Depending on the amount of computational power deployed, the overall results of the text analysis may still be generated in real time or near real time from the client perspective in at least some implementations despite the batch-mode analysis, especially if N is kept within reasonable bounds. In other embodiments, a post-probabilistic-transformation algorithm may be run for each new data record that is processed.

In some embodiments, the analysis of a large corpus of text-containing data records using probabilistic data structures may be at least partially parallelized. For example, the volume of log records to be analyzed at a provider network's monitoring/analysis service may be high enough that multiple analysis engines may be deployed for generating respective instances of the probabilistic data structures corresponding to respective subsets of the log records. The internal structure of the probabilistic data structures may be such that it is easy to aggregate the contents of multiple instances of the data structures, e.g., using bit level Boolean "OR" operations or using vector instructions of the hardware servers being employed. Such efficiently-aggregated probabilistic data structures may be used as input for the post-probabilistic-transformation algorithms in some embodiments.

Example System Environment

FIG. 1 illustrates an example system environment in which probabilistic data structures may be generated from text records for machine learning applications, according to at least some embodiments. As shown, system 100 comprises a provider network 102 at which a variety of network-accessible services may be implemented, including for example a virtualized computing service 108, a storage service 110 and a monitoring and analysis service 104. Resources of at least some services such as the virtual computing service 108 and/or the storage service 110 may be allocated to clients in one of several allocation modes in the depicted embodiment, such as a long-term reservation mode (in which the resources are allocated for extended time periods), on-demand mode (in which the resources are assigned to clients as and when needed, and freed when the clients no longer need them), and so on. In the case of the virtualized computing service 108, the resources allocated to clients may include guest virtual machines, with one or more guest virtual machines being instantiated at each of numerous virtualization hosts 160 such as 160A or 160B. In the case of the storage service 110, the allocated resources may comprise storage objects (such as binary or unstructured storage objects accessible via web services interfaces, database instances, file systems, and the like) with portions of one or more storage objects being instantiated at each of numerous storage servers 165 such as 165A or 165B.

Information about the health and status of the allocated resources (such as guest virtual machines or storage objects) may be collected and processed at monitoring and analytics (MAS) service 104 in the depicted embodiment. The monitoring and analytics service 104 may obtain health/status data from a number of MAS agents in various embodiments, such as agents 162A-162D installed at or associated with virtualization host 160A, virtualization host 160B, storage server 165A and storage server 165B respectively. A number of different categories of data may be collected in the depicted embodiment at the monitoring and analytics service 104, including for example log records which include text attributes. Resources of the monitored services may include log sources at different layers of the hardware/software stacks being used. For example, at virtualization host 160A and 160B, respective log sources 161A and 161B may be present at the virtualization management components (e.g., hypervisors or administrative-domain operating systems), the operating systems of the guest virtual machines, user-mode application modules running on behalf of the clients at the guest virtual machines, and so on. At storage servers 165A and 165B, log sources 161 C or 161D may comprise modules at the hardware storage devices and controllers, software virtualization management components, and so on.

Monitoring coordinator components 170 of the monitoring and analytics service 104 may be responsible for orchestrating the establishment of MAS agents 162 at various resources of other provider network services such as services 108 and 110 in the depicted embodiment. For example, if a client 177 wishes to utilize the monitoring service 104 for some set of allocated resources, the MAS programmatic interfaces 192 may be used by the client to register their resources, approve the installation of MAS agents at the resources, and view the results of the monitoring and analysis after the agents have been instantiated. A number of different types of programmatic interfaces 192 may be implemented in various embodiments, such as a set of application programming interfaces (APIs), web-based consoles, command-line tools, graphical user interfaces and the like. The data generated at the log sources 161 may be transmitted by the MAS agents 162 to one or more record aggregators 171 (e.g., 171A or 171B) of service 104 in the depicted embodiment. At least some of the log data may then be analyzed, e.g., using various supervised or unsupervised machine learning algorithms at analysis engines 172 (e.g., 172A, 172B, etc.). A number of algorithms for different phases of the analysis may be available via machine learning algorithm library 175—e.g., algorithms for generating probabilistic data structures to represent term frequencies in the log records, algorithms for dimensionality reduction, classification/clustering, and the like.

In some embodiments, the raw text of the log records may be transmitted by the MAS agents 162 to the record aggregators 171, and the probabilistic data structures may be generated at the record aggregators using selected mapping or transformation functions. In other embodiments, probabilistic data structures may be generated at the MAS agents 162, and the data structures may be sent to the record aggregators 171 rather than the raw log records. For at least some terms identified within a log record, one or more entries within a probabilistic data structure may be identified, using one or more hash functions or other transformation functions, as targets to be updated to represent the presence of the term in the record in the depicted embodiment. A given entry in the probabilistic data structure may represent the presence or count of several different terms, thereby introducing a level of inexactness into the hashing-based mapping. That is, the relationship between a given entry in the probabilistic data structure and given text term may not be 1:1—instead, t different terms may be mapped to the same entry in at least some embodiments, where t may depend on the nature of the transformation function being applied to the text terms. The value of t for a given entry may not be known a priori. In at least some embodiments, a given entry of the probabilistic data structure may represent t terms and r records, where r may be greater than one. Thus, for a total of N log records containing a total of T distinct text terms, a probabilistic data structure comprising a matrix of size $N_{pds} \times T_{pds}$ may be constructed in some embodiments, where $N_{pds}$ is less than or equal to N and $T_{pds}$ is less than T.

In some embodiments, instances of probabilistic data structures may first be generated for respective subsets of the log data to be analyzed, and then aggregated to analyze larger subsets or all of the data. For example, if there are 1000 log sources in a given environment, and during a given iteration of analysis 10000 log entries on average from each of the log sources is analyzed, the raw log data from 100 of the log sources may be transformed into a probabilistic data structure at each of 10 record aggregators 171. Each of the probabilistic data structures for one tenth of the data may be treated as a blob (binary large object) which can be aggregated with other such blobs using efficient low-level primitives such as Boolean OR operations. The ten data structures may be aggregated (e.g., at one of the analysis engines 172) into a single more comprehensive probabilistic data structure, which can then be used as input for further stages of processing, such as dimensionality reduction, clustering and so on. In one embodiment, for example, the end product of the machine learning procedure may comprise classes of log records, each class representing information pertaining to a particular configuration change or status of a related group of one or more resources. Due to the uncertainty or inexactness introduced by the probabilistic data structure mappings, in some embodiments, error detection or correction may be performed before the results of the analysis are presented to clients 177 via programmatic interfaces 192 (or stored in a repository) in some embodiments. In other embodiments, such error detection/correction may not be required. In some embodiments, a post-classification sanity check may be performed instead of or in addition to detailed error analysis, e.g., to verify that the class boundaries appear reasonable.

In at least some embodiments, various parameters of the hashing-based transformation functions applied to the text may be selected at least partly on the basis of client preferences. For example a client 177 may indicate a maximum budget (expressed in resource usage terms such as CPU-seconds, or in currency terms) to be used for analyzing their log records, or a maximum acceptable term-confusion level, and the service 104 may decide how many and which hash functions are to be used based on the client's goals. In at least one embodiment, the execution of the machine learning algorithm may be delegated to another network-accessible service of the provider network 102—e.g., instead of using analysis engines 172 that are dedicated to the monitoring and analytics service 104, execution platforms of a machine learning service of the provider network may be employed, or a set of execution platforms of the virtual computing service may be used. It is noted that although the probabilistic approach to text analysis is illustrated in the context of analyzing log records in FIG. 1, the techniques may be applied with equal success to text data from any source (or other high-dimensionality data) in various embodiments as mentioned earlier.

Log Record Classification Procedure Overview

Figure 2:
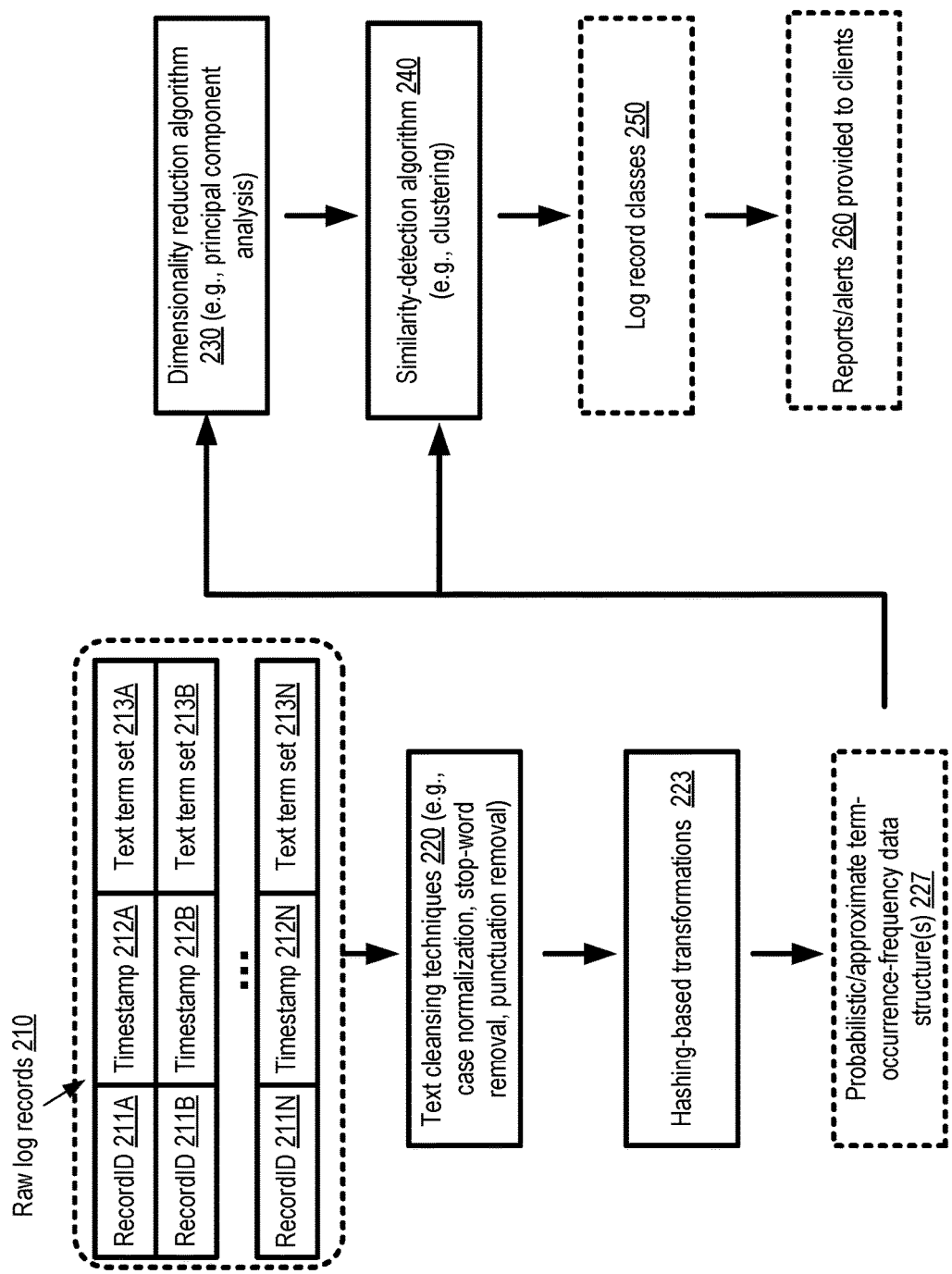
FIG. 2 illustrates an overview of log record classification using probabilistic data structures for approximating term occurrence frequencies, according to at least some embodiments.

One of the common objectives of the analysis of text records is classification—that is, the goal is to group similar records together. FIG. 2 illustrates an overview of log record classification using probabilistic data structures for approximating term occurrence frequencies, according to at least some embodiments. In the depicted embodiment, each raw log record 210, such as 210A, 210B or 210C may include values for one or more attributes, including at least one text attribute. Each record 210 may have a unique record identifier 211 (e.g., record identifiers 211A, 211B or 211N), which may for example correspond to a line number or offset within a particular log file from a particular log source. In various embodiments in which log records obtained from a large number of log sources are processed, the identity of the log source may be incorporated within the record identifier, e.g., by the monitoring service agent which initially extracts the log records. Each log record 210 may comprise a respective timestamp 212 (e.g., 212A, 212B or 212N) and at least one set of text terms 213 (e.g., 213A, 213B or 213N). The set of text terms may also be referred to as the "log message". In some embodiments the raw log records may comprise other attributes as well, such as log levels "ERROR", "INFO" or "DEBUG" corresponding to the relative importance of the log messages, for example. In some algorithms, several different text attributes may be combined into one, or log level and/or log source attributes may be combined or concatenated with the text attributes.

The text portion of a given log record may be cleansed in some embodiments in a preliminary step of the analysis. Text-cleansing techniques 220 may comprise, for example, automated language translation to a common language, case normalization (in which words or terms may be converted to all-lower-case or all-upper-case), stop-word removal (in which common words that are not necessarily information-rich, such as "a", "and", "the", etc., are removed), punctuation removal, word stemming, lemmatization and so on. One or more hashing-based transformation functions 223 may then be applied to at least some of the text terms that remain after cleansing. Each such transformation may map a text term to one or more elements or entries of a probabilistic data structure which allows for duplicate mappings—e.g., in some cases, multiple terms may be mapped to the same entry of the probabilistic data structure as discussed below in the context of FIG. 3 and FIG. 4. The entries to which each term is mapped may be updated; the details of exactly how the entries are updated (e.g., whether a simple binary value is used to indicate the presence of the term in the text, or whether an integer is incremented each time a term is encountered) may vary from one implementation to another. The size of the probabilistic data structure may typically be smaller (often much, depending on the details of the selected transformation functions) than a matrix representing the exact occurrence counts of each term. In at least one embodiment, instead of or in addition to mapping words considered in isolation, groups of two or N words/terms (called n-grams) may be mapped.

The probabilistic data structures representing the presence/absence or occurrence frequencies of various terms may then be employed as input for additional stages of the analysis. In some embodiments, a dimensionality-reduction algorithm 230 such as principal component analysis may be applied to the contents of the probabilistic data structures, and the reduced-dimension output produced may be used as input for a similarity detection algorithm 240 (e.g., a clustering-based classification algorithm). In other embodiments, the probabilistic data structures may be compact enough that further dimension reduction is not required, and the probabilistic data structures may be used without further transformations as input for a similarity-detection algorithm 240. In some embodiments, the text analysis service or tool may make a decision as to whether further dimension reduction is to be used on the probabilistic data structure based on various factors—e.g., based on the specific similarity detection technique selected, available resources or time, the size or sparsity of the approximate or probabilistic data structure, and so on. An individual log record may be placed into one of several classes 250 by the similarity detection algorithm 240. Depending on client preferences and/or on presentation heuristics associated with the text analysis, reports or alerts 260 regarding the analysis may be provided programmatically to clients.

Examples of Hashing-Based Transformations

Figure 3:
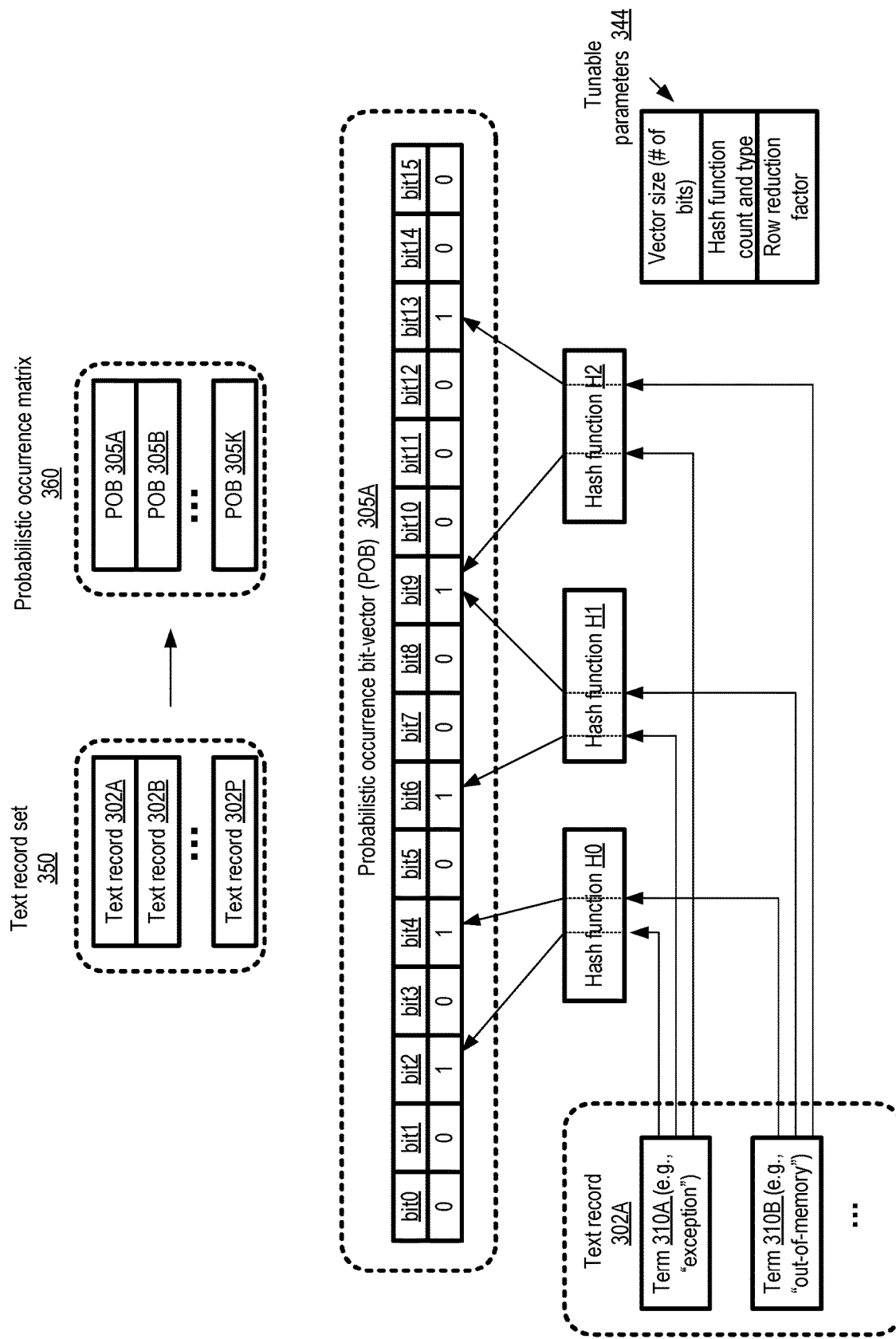
FIG. 3 illustrates the generation of probabilistic occurrence bit vectors from text data using a plurality of hash functions, according to at least some embodiments.

In some embodiments, multiple hash functions may be applied to a given text token during the generation of the probabilistic data structures. FIG. 3 illustrates the generation of probabilistic occurrence bit vectors from text data using a plurality of hash functions, according to at least some embodiments. In the depicted embodiment, three hash functions H0, H1 and H2 may be applied to each individual term of each text records. Note that the cleansing operations described above may already have been performed prior to the use of the hash functions. Text record 302A, for example, comprises terms 310A (e.g., the word "exception") and 310B (e.g., the term "out-of-memory"). Term 310A is mapped to bit2 of a 16-bit probabilistic occurrence bit-vector (POB) 305A by H0, to bit6 by H1, and to bit9 by H2. Term 310B is mapped to bit4 by H0, to bit9 by H1, and to bit13 by H2. The POB 305A is assumed to be empty (all zeroes) prior to the examination of text record 302A to simplify the discussion. Each POB entry to which a term is mapped by any of the hash functions is set to 1 in the depicted embodiment (and remains set at 1 in the presence of multiple mappings for different terms).

The presence of a "1" in a particular entry of POB 305A may indicate that one or more mapped terms were present in the corresponding text, but may not be sufficient to specify (from the POB itself) exactly which terms were mapped. Thus, for example, both terms 310A and 310B happen to be mapped to bit9 (by different hash functions), so the presence of a 1 in bit9 may not be unambiguous evidence of the presence of either term in the text. This ambiguity, which corresponds to possible false-positive indications of the presence of a given term, may be referred to as term-confusion in the context of text processing. It is noted that a similar hashing approach may be used for set membership detection (e.g., using Bloom filters) in various applications which may not necessarily involve text processing.

Applying the three hash functions H0, H1 and H2 to each term in the text record set 350, a probabilistic occurrence matrix 360 may be generated in various embodiments. In at least some embodiments, a respective occurrence vector 305 may be generated for each text record 302, so that the number of rows in the matrix 360 matches the number of text records analyzed. In other embodiments, the number of rows in matrix 360 may be less than the number of text records analyzed—e.g., a single POB 305 may be generated from a group of text records 302.

The key tunable parameters 344 for the hashing approach outlined in FIG. 3 include the vector size (the number of bits used), the hash function count and type, and the row reduction factor—e.g., how many distinct text records are to be represented by a single row of occurrence matrix 360. A number of factors may be taken into account when deciding the parameters in different embodiments—e.g., constraints on the desired extent of term-confusion, available resource capacity (e.g., processing capacity, memory capacity and/or storage capacity) and/or client-specified preferences and so on may influence the parameter values selected.

Figure 4:
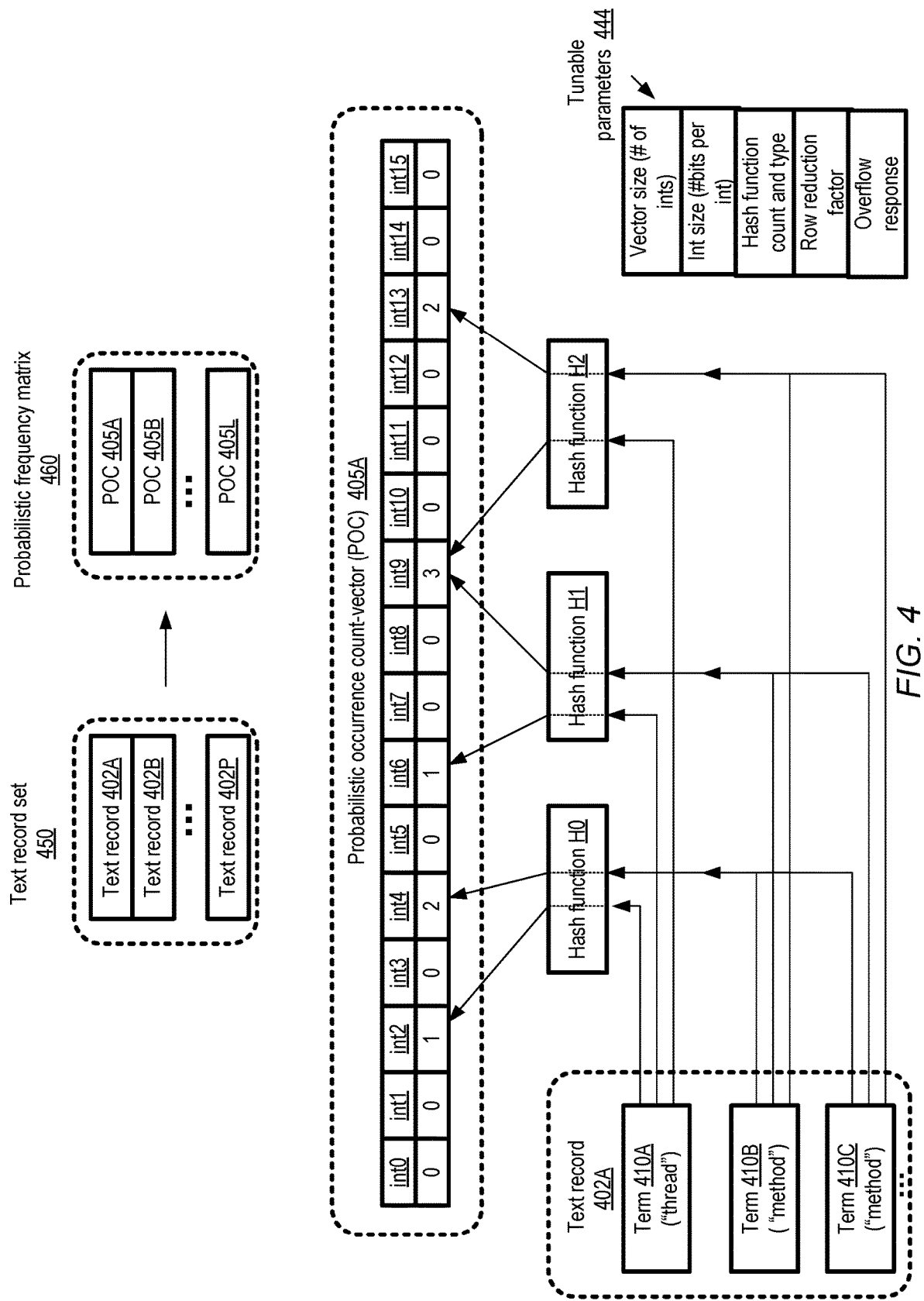
FIG. 4 illustrates the generation of probabilistic occurrence count vectors from text data using a plurality of hash functions, according to at least some embodiments.

In the embodiment depicted in FIG. 3, a single bit was used to indicate the occurrence of a term. As a result, an indication of how many times a term was repeated (if such repetition occurred) in the text record(s) for which a POB was generated may not be available in the technique of FIG. 3. FIG. 4 illustrates the generation of probabilistic occurrence count vectors from text data using a plurality of hash functions, according to at least some embodiments. In the approach shown in FIG. 4, instead of using a single bit to represent the presence or absence of a term, a positive integer whose value is expressed using multiple bits (e.g., 16 bits or 32 bits) may be used. As in FIG. 3, three hash functions are used in the example shown in FIG. 4. Each time a term 410 is encountered within the text record 402A, the entry to which it is mapped by each of the hash functions is incremented.

The term "method" occurs twice in text record 402A (as terms labeled 410B and 410C) in the depicted example, while the term "thread" (labeled 410A) occurs once. The integers of probabilistic occurrence count-vector (POC) 405A are each assumed to be zero prior to the examination of record 402A. Term 410A is mapped to integers int1, int6 and int9 by the hash functions H0, H1 and H2. Terms 410B and 410C, which are duplicates, are each mapped to int4, int9 and int13 by H0, H1 and H2. Since all three terms are mapped to int9, the value of int9 is set to 3 in the depicted example; the values of int4 and int13 are each set to 2 because of the repetition of term 410B.

Probabilistic frequency matrix 460 comprising non-negative integers is generated to represent text record set 450 in the depicted example. The number of rows in the matrix 460 may match the number of distinct records examined in some embodiments. In other embodiments, the number of rows of frequency matrix 460 may be smaller than the number of text records examined. As in the scenario shown in FIG. 3, the tunable parameters 444 whose values are to be selected for the integer-based technique of FIG. 4 may include the vector size (the total number of integers), the hash function count and type, and the row reduction factor. In addition, the tunable parameters 444 may include the integer size (the number of bits used to express individual integers, which corresponds to the maximum occurrence frequency value, such as 8-bits for a maximum frequency of 255 or 16 bits for a maximum frequency of 65535) and the response to an integer overflow (e.g., how a POC entry is to be represented in the event of an integer overflow). Similar factors as those discussed in the context of FIG. 3 for tunable parameters 344 may be taken into account to decide values for the tunable parameters 444 of FIG. 4.

Efficient Aggregation of Probabilistic Data Structures

Figure 5:
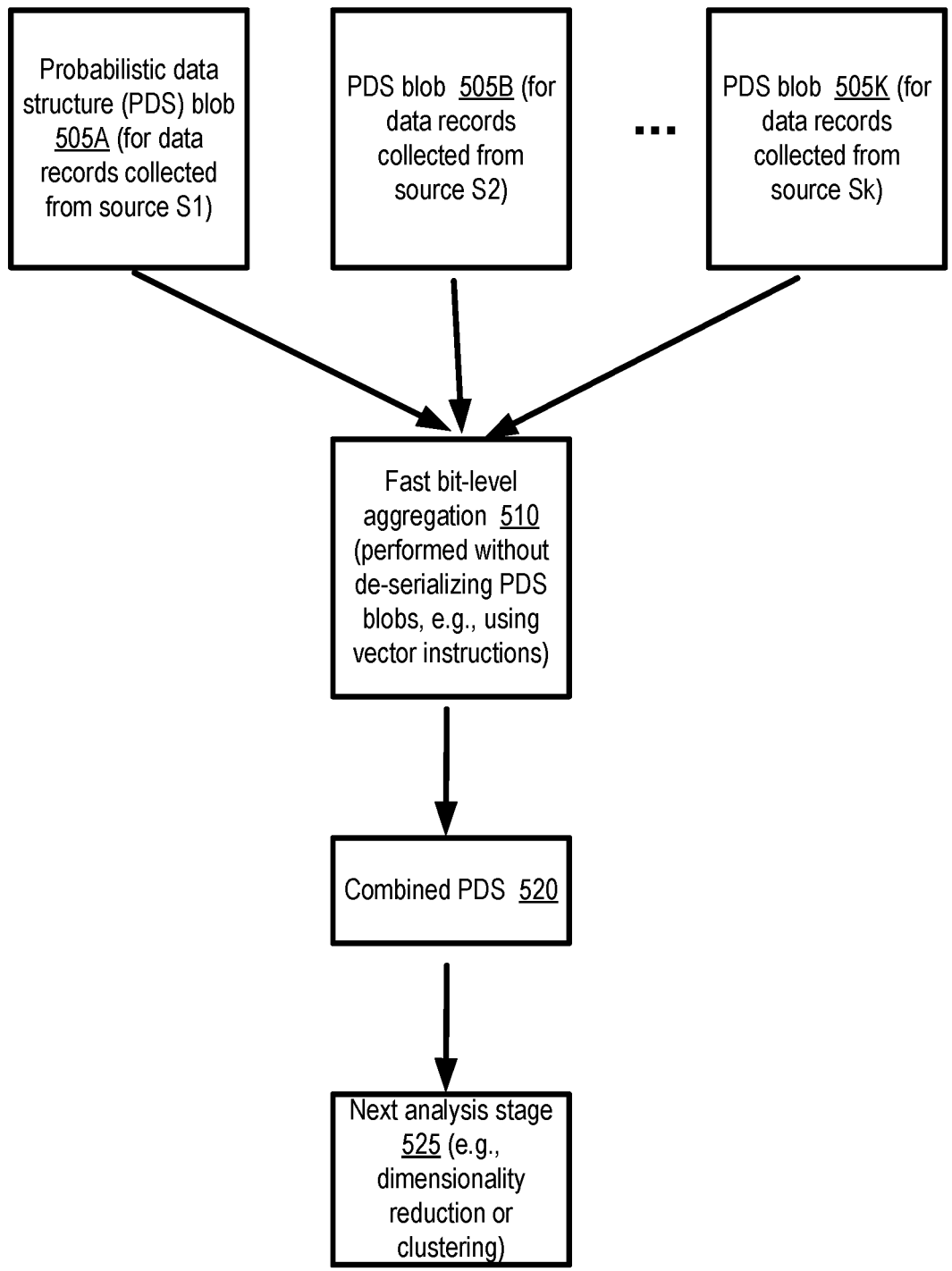
FIG. 5 illustrates an example of efficient aggregation of contents of probabilistic data structures for different sets of text records, according to at least some embodiments.

In many environments, the text records on which machine learning algorithms are to be applied may arrive at very high rates. As a result, an approach that enables the use of multiple computing platforms in parallel for at least some portion of the analysis may be preferable. In various embodiments, probabilistic data structures used for representing term occurrences within different groups of records may have the property that they can be combined or aggregated very efficiently, which may help with parallelization. FIG. 5 illustrates an example of efficient aggregation of contents of probabilistic data structures for different sets of text records, according to at least some embodiments.

In the depicted embodiment, respective probabilistic data structures may be generated for text records generated at different sources, and aggregated using efficient bit-level Boolean operations. For example, a monitoring service agent MSA1 may collect raw log records from a data source S1 (e.g., one or more virtualization hosts), and a corresponding probabilistic data structure blob 505A (binary large object) for S1's records may be generated using hashing-based transformations similar to those discussed above. Respective probabilistic data structure blobs 505B, . . . , 505K may be generated corresponding to text records of other data sources S2, . . . , Sk. The contents of the different blobs 505 may be combined using bit-level aggregation 510, e.g., by performing logical OR operations on the bits which make up the blobs, without de-serializing the blobs or extracting the numeric values from the blobs. In at least some embodiments, the processors or cores of computing devices at which the aggregation is performed may support at least some vector instructions which can be used to combine the blob contents in bulk. The combined probabilistic data structure 520, which incorporates approximate term occurrence/frequency information regarding data sources S1-Sk, may then be used as input for the next stage of the analysis 525 (e.g., for dimensionality reduction, clustering, etc.) in the depicted embodiment.

The aggregation of the probabilistic data structures may be implemented at different components of the text analysis system in various embodiments. In embodiments in which a monitoring and analytics service similar to that of FIG. 1 is being used, the aggregation may be performed at, for example, some combination of the MAS agents 162, the record aggregators 171, or the analysis engines 172. In at least one embodiment, the aggregation may be performed at several different layers of the system—e.g., a first level of aggregation may be performed at the MAS agents 162, the combined data structures received from several different MAS agents may again be combined at a record aggregator 171, and so on. In at least some embodiments, the aggregation may introduce another level of approximation—that is, the information contained in an aggregated probabilistic data structure may be less exact regarding term occurrences in particular text records than the information contained in the separate data structures prior to aggregation. In one embodiment, the text analysis algorithm may take this potential loss of information into account when determining whether (and how many times) the data structures should be aggregated.

Post-Classification Analysis Example

The use of probabilistic or approximate data structures may potentially result in errors of various kinds, depending on the types of machine learning algorithms being used. In a scenario in which text records are being placed into groups based on the similarity of their content, e.g., using a classification algorithm, a given text record may sometimes be placed into a class whose members are not particularly similar to it. In some embodiments, post-processing steps may be taken to detect and/or correct at least some such errors introduced as a result of the use of approximations, or to perform a sanity check on the similarity of the terms of at least some classes. For example, the member records of at least some classes may be re-analyzed to verify that they have not been misclassified, and only those records which share a set of representative terms may be retained in a class.

Figure 6:
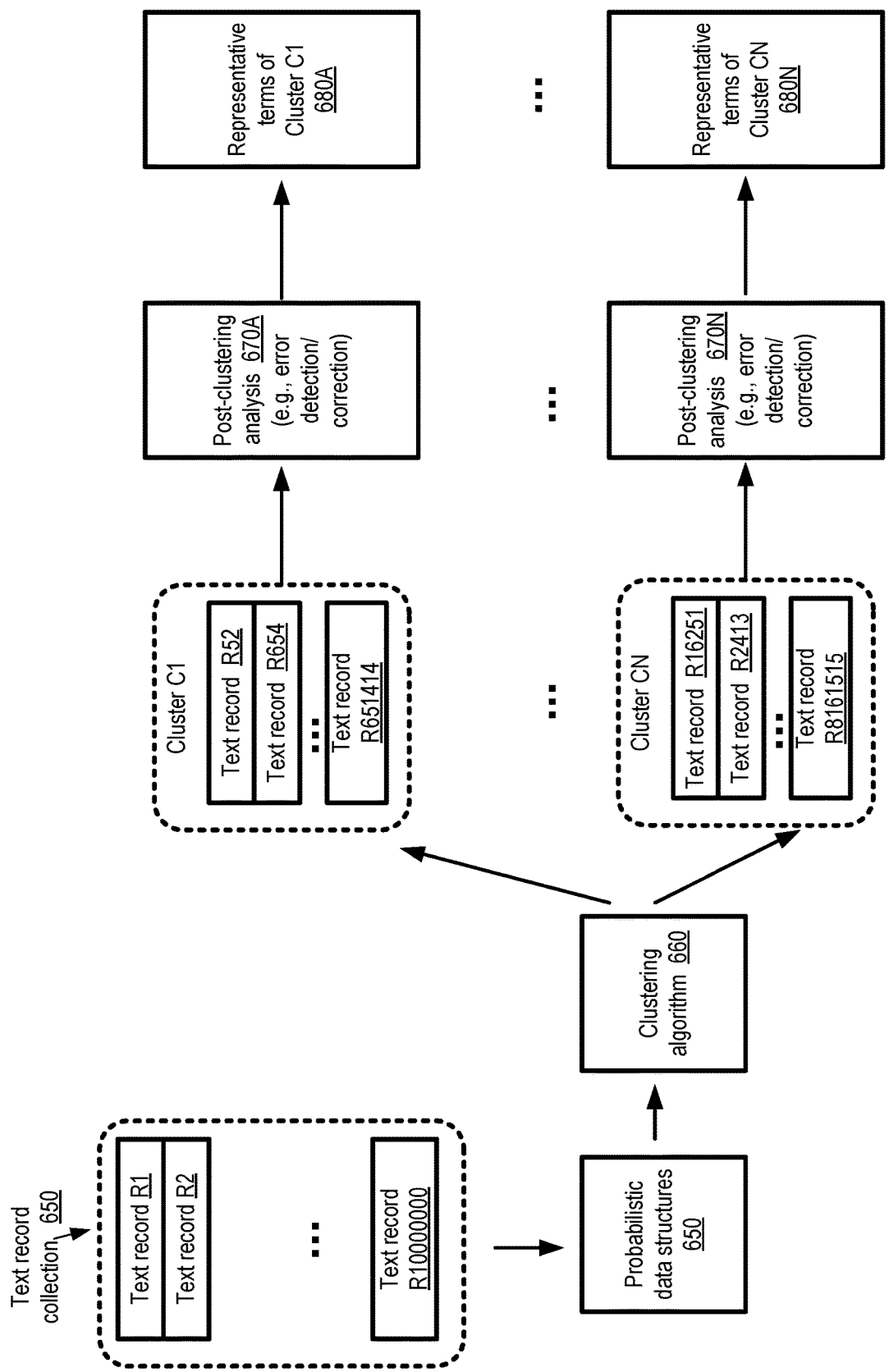
FIG. 6 illustrates an example of post-classification analysis of text records to obtain representative terms, according to at least some embodiments.

FIG. 6 illustrates an example of post-classification analysis of text records to obtain representative terms, according to at least some embodiments. A text record collection 650 comprises ten million records R1-R10000000. Using probabilistic data structures 650 derived from the text records using transformation functions of the kind discussed above as input, a clustering algorithm 660 may designate individual records as members of one of classes C1-CN in the depicted embodiment. For example, class C1 comprises records R52, R654, and R651414, while class CN comprises records R16251, R2413 and R8161515. With respect to at least some of the classes, respective post-clustering analyses 670 (e.g., 670A or 670N) may be performed. During such analysis, records which appear to have been classified erroneously may be removed from their original classes, or tagged as being suspected instances of misclassification. A set of common or representative terms 680 (e.g., 680A or 680B) may be identified for each cluster and provided to clients via programmatic interfaces in at least some embodiments.

It is noted that in some embodiments, the information about the mappings between individual terms in the text records and the specific entries of the probabilistic data structures to which those terms are mapped may not be retained with the probabilistic data structures. In such embodiments, after the clustering is completed, the original text records may be re-examined for error detection/correction and/or the selection of representative terms, e.g., using exact rather than probabilistic data structures for occurrence frequencies. In some embodiments, some classes of text records may be of greater importance from a client's perspective than others—e.g., class C1 may represent log records which require an urgent response from a client, while class C2 may represent log records which represent state changes that do not require quick responses. In this example, the correctness of the classification of log records into category C1 may be more critical than the correctness of the classification of log records into category CN. Post-clustering analysis of C1 may therefore be prioritized higher than the post-clustering analysis of CN (or post-clustering analysis may not even be performed for CN). In at least some embodiments, error detection/correction of the kind shown in FIG. 6 may not be implemented.

Client Request Example

Figure 7:
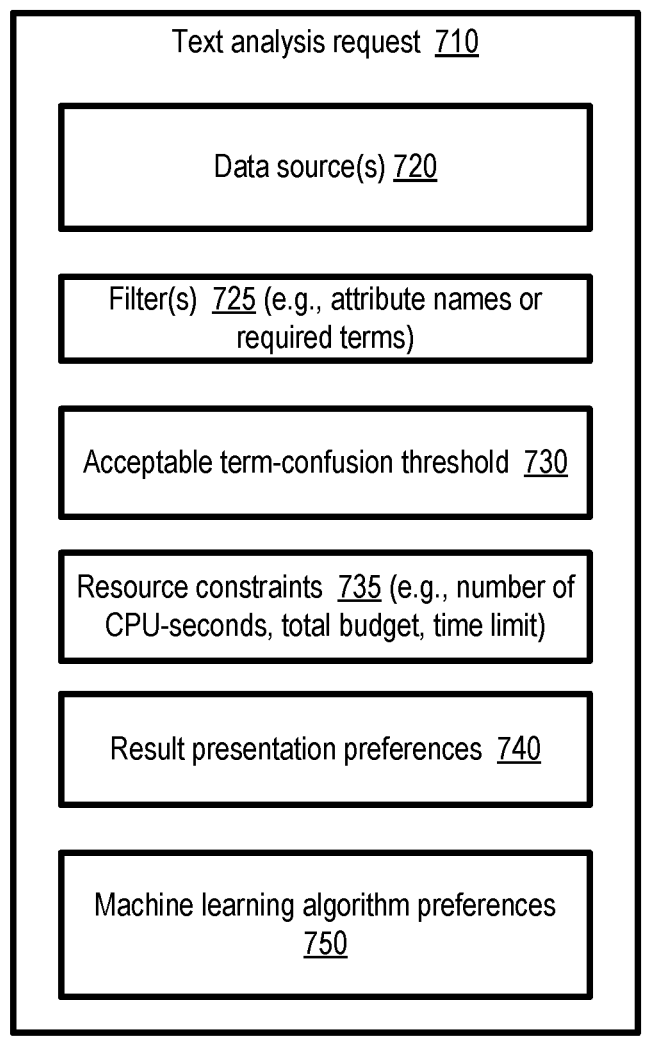
FIG. 7 illustrates example contents of a text analysis request which may be submitted by a client of an analytics service, according to at least some embodiments.

In some embodiments, the probabilistic algorithm for text analysis may be invoked in response to specific requests from clients; in other embodiments, probabilistic text analysis may be performed by default on various sets of records, and may not require clients to submit specific requests. FIG. 7 illustrates example contents of a text analysis request which may be submitted by a client of an analytics service, according to at least some embodiments. As shown, request 710 may comprise respective entries indicating the data source(s) 720, one or more filters 725, an acceptable term-confusion threshold 730, resource constraints 735, result presentation preferences 740 and/or machine learning algorithm preferences 745 in the depicted embodiment.

The data source entry 720 may specify which sets of data records are to be examined and analyzed. For example, one client of an analytics service implemented at a provider network may want text records generated outside the provider network (e.g., at a client-premises data center, at some set of news sources, at a social media site, or at various devices or sensors outside the provider network) to be analyzed, while a second client may want log records generated at a set of resources of a virtualized computing service of the provider network itself to be analyzed.

Filters 725 may be used to indicate the subset of the text records which are to be analyzed. For example, some clients may only want log records with a log level of "ERROR" to be analyzed, while other clients may want all log records regardless of level to be analyzed. In some cases a client may specify particular terms that have to be present in a text record for it to be analyzed further—e.g., the term "memory" may be specified as a requirement for a text record to be analyzed.

In some embodiments, clients may be able to indicate target acceptable thresholds 730 for term confusion or error. For example, one client may indicate that an erroneous classification rate of 0.1% is acceptable (e.g., that one out of every one thousand records may be misclassified). The units in which the term confusion threshold is specified may vary in different embodiments and/or for different machine learning algorithms. In one embodiment, instead of using numeric thresholds, a term confusion threshold may be indicated using subjective phrases such as "extremely high accuracy" or "medium accuracy". The subjective phrases may be associated with respective costs in some such embodiments—e.g., the cost for analyzing a million records with "extremely high accuracy" may be higher than the cost for analyzing a million records with "medium accuracy".

In some embodiments, clients may be charged for text analysis based on the resources and/or time consumed on their behalf. In the depicted embodiment, a client may indicate one or more constraints 735 to be enforced—e.g., expressed in units such as a maximum number of CPU-seconds to be consumed, a maximum billing amount, and/or a time limit. Such constraints may be used by the analytics service, for example, together with the term confusion thresholds if any such thresholds were specified, to determine parameters of the hashing-based transformations. In some cases one or more entries of a request 710 may be incompatible with other entries—e.g., a client may specify a term-confusion threshold which cannot be met if the resource constraints are enforced. In one embodiment, the client may be informed regarding the incompatibility, and potentially asked to reformulate the text analysis request.

The result presentation preferences 740 may indicate the format in which the results of the machine learning algorithm are to be provided to the client, and the interface to be used—e.g., as a report available via a click on a web-based console, or as a set of alerts or notifications. Some clients may indicate details of the particular machine learning algorithms 745 (e.g., including the dimensionality reduction techniques, if any, to be used and/or the unsupervised and/or the supervised or unsupervised learning algorithms) they would like to be used for their text records.

It is noted that at least in some embodiments, one or more of the text analysis request entries shown in FIG. 7 may be omitted. Default values for some or all of the entries indicated in FIG. 7 may be used in various embodiments, e.g., in the event that the client does not include the entries in the analysis request.

Methods for Scalable Text Analysis Using Probabilistic Data Structures

Figure 8:
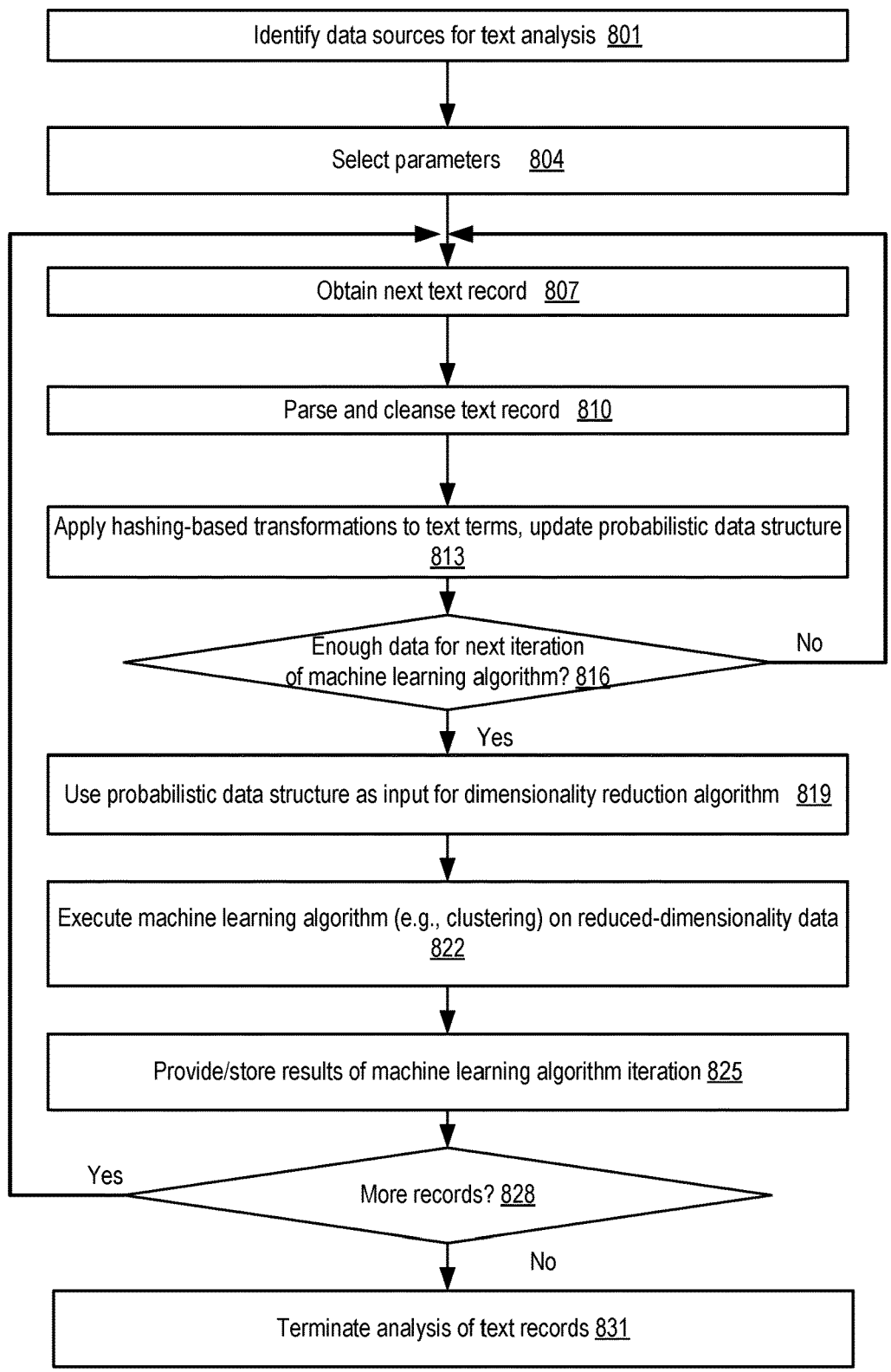
FIG. 8 is a flow diagram illustrates aspects of operations that may be performed to analyze text records using probabilistic data structures which represent term occurrence information, according to at least some embodiments.

FIG. 8 is a flow diagram illustrates aspects of operations that may be performed to analyze text records using probabilistic data structures which represent term occurrence information, according to at least some embodiments. As shown in element 801, one or more data sources for text analysis on behalf of one or more clients or users may be identified, e.g., at an analytics service implemented at a provider network or at a standalone text analyzer which is not part of a network-accessible service. In some cases the data sources may be indicated in a client request for text analysis, while in other cases no request may be required to trigger the text analysis—e.g., log text analysis may be part of the default functionality provided by a monitoring service of a provider network.

Parameters governing the analysis, including the specific machine learning algorithm to be used, the dimensionality reduction technique to be used (if any), and various details of the hashing-based transformation functions to be used for generating probabilistic data structures from the text records may be identified (element 804). Such parameters may include, for example, the data types to be used to represent term occurrences or frequencies (e.g., whether a single bit is to be used per term, as in the example shown in FIG. 3, or an integer is to be used, as in the example of FIG. 4), the maximum integer size and overflow response (if integers are used), the size of the vector to be constructed per text record or per group of text records, the number and type of hash functions to be used, whether the number of rows in the probabilistic data structure created for a given set of text records is to be smaller than the number of records in the set, and so on. In some embodiments, at least some of the parameters may be selected based on heuristics, or on the basis of knowledge base entries of the text analyzer or analytics service. One or more of the parameters may be selected based on client input in various embodiments.

An iterative procedure for analyzing the text records may be initiated after the parameters have been selected. When the next text record to be analyzed is obtained (element 807), it may be parsed and cleansed (element 810) in the depicted embodiment. The cleansing may include, for example, techniques such as case conversion (to all-lower-case or all-upper case), punctuation removal, stop-word removal, and the like. After the text record is cleansed, the hashing-based transformations whose parameters were determined in operations corresponding to element 804 may be applied to individual terms within the text. The outputs of the transformations for a given term may identify the particular entries in the probabilistic data structures that are to be updated (if the entries are not already set appropriately) to represent the presence of the term in the text record. In at least some cases a given entry may correspond to more than one term, thereby introducing approximation or inaccuracy in the representation. The entries to which the terms in the text record are mapped may be updated using the transformation functions (element 813). In some embodiments, the transformation functions may not necessarily be applied to all the text records generated at the data sources—e.g., a filter indicating conditions that have to be met by a text record for it to be accepted for further analysis may be specified by a client, and records which do not meet the filter criteria may be rejected.

In some embodiments, the analysis of the probabilistic data structure representing approximate term occurrences/frequencies may be performed iteratively—e.g., only after a selected number of "new" text records have been incorporated into the probabilistic data structure(s). If enough data has been gathered for a new iteration to be started (as determined in element 816), the probabilistic data structure(s) may be provided as input to a dimensionality reduction algorithm in the depicted embodiment (element 819). Any of a wide variety of dimensionality reduction algorithms may be used in various embodiments, including for example principal component analysis, independent component analysis, the information bottleneck algorithm, locally linear embedding, nonnegative matrix factorization, probabilistic latent semantic analysis, and the like. If the amount of data collected is insufficient for the next iteration of the machine learning algorithm, more text records may be collected, and the operations corresponding to elements 807-813 may be repeated for each new text record until sufficient data has been gathered. In some embodiments, depending for example on the specific algorithm being used, the number of text records needed for a new iteration of the machine learning algorithm may be as small as one—that is, as soon as the probabilistic data structure is updated for a given text record, the condition tested in element 816 may be met and the subsequent phases of the analysis may commence. In at least one embodiment, the number of text records that are considered sufficient for a given round of machine learning may be determined at least in part on responsiveness requirements of the text analyzer—e.g., if an analysis of log records is to be provided in real-time or near-real-time, only a small number of new records may be needed per iteration.

The reduced-dimension output produced in operations corresponding to element 819 may be used as input for the next stage of analysis, in which for example a machine learning algorithm such as clustering (or another similarity-detection algorithm) may be employed (element 822). The results of the current iteration of the machine learning algorithm, which may for example indicate groups of similar text records identified thus far, may be stored and/or provided programmatically to a client (element 825). In some embodiments, as discussed in the context of FIG. 6, an error detection/correction algorithm may be employed before the results are stored or provided to the client, e.g., in an effort to compensate for errors which may have been introduced due to the use of probabilistic rather than exact data structures. If there are more records to analyze (as detected in operations corresponding to element 828), the operations corresponding to elements 807 onwards may be repeated for the next iteration; otherwise, the text analysis may be terminated for the data sources identified in operations corresponding to element 801.

It is noted that in various embodiments, at least some operations other than those illustrated in the flow diagram of FIG. 8 may be used to implement the probabilistic text analysis techniques described above. Some of the operations shown may not be implemented in some embodiments or may be implemented in a different order, or in parallel rather than sequentially.

Use Cases

The techniques described above, of using probabilistic rather than exact data structures to represent term frequencies for machine learning-based text analysis, may be useful in a variety of embodiments. Many text data sets may comprise millions of observations, with each observation comprising tens, hundreds or even thousands of text terms. For example, a monitoring service implemented in a provider network may be charged with analyzing log records that are being generated from tens of thousands of resources, resulting in aggregate log record generation rates of millions of records per second. Storing exact counts of all the different terms in all the log records may be impracticable, even if sophisticated dimensionality reduction algorithms are available. By using the probabilistic approach, much smaller representations of term occurrences or frequencies may be generated. Although some errors may be introduced into the analysis as a result of the approximate nature of the data structures, such errors may be kept within reasonable bounds by choosing the transformation function parameters appropriately in most cases. Furthermore, techniques for error detection and/or correction may be applied for at least a high-priority subset of the results of the machine learning algorithm employed. The parameters used for the probabilistic data structures, which may affect the extent to which errors are introduced, may be tailored to meet the needs of individual clients of the text analysis system.

Illustrative Computer System

Figure 9:
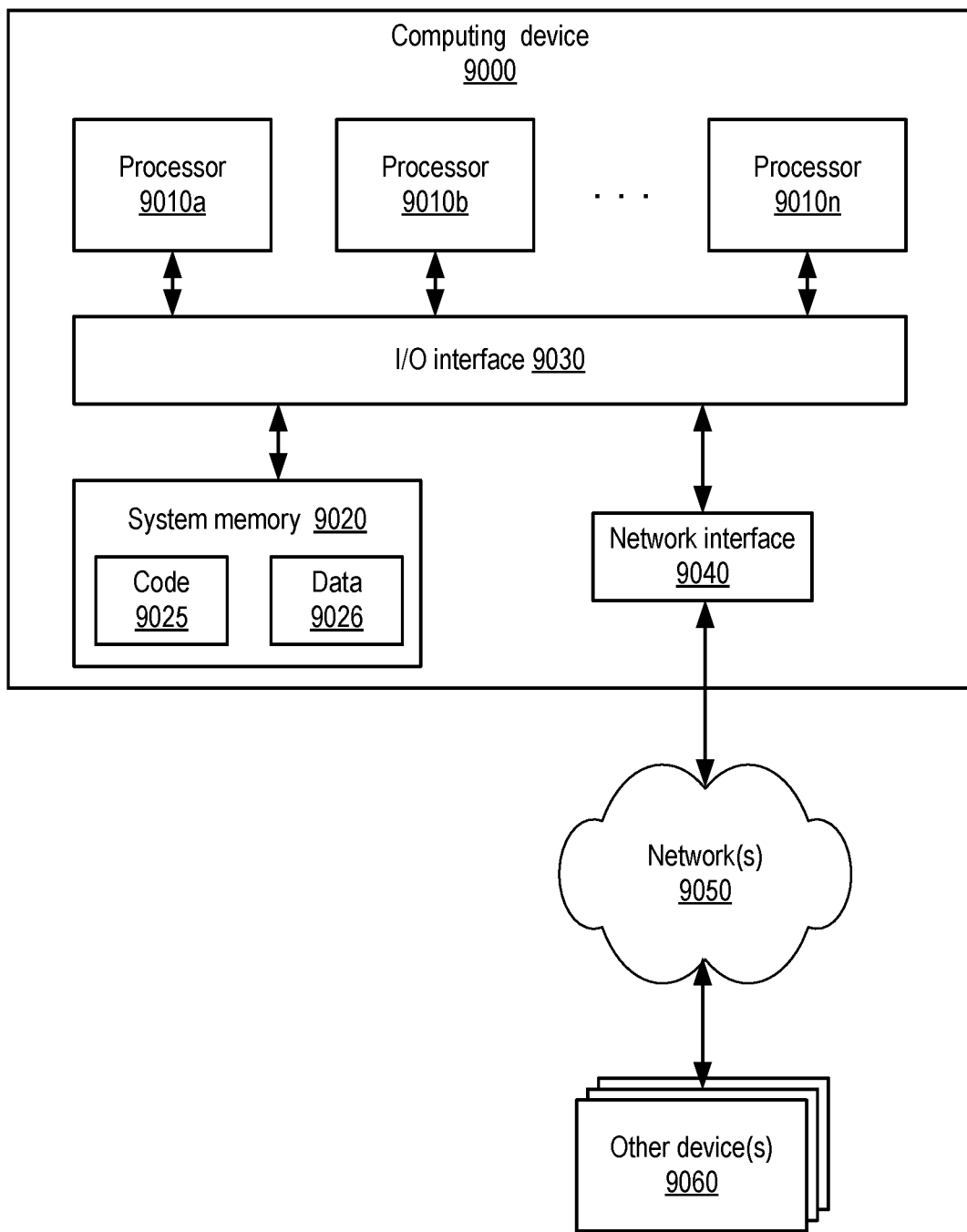
FIG. 9 is a block diagram illustrating an example computing device that may be used in at least some embodiments.

In at least some embodiments, a server that implements a portion or all of one or more of the technologies described herein, including the techniques to generate the probabilistic data structures, other components of a monitoring and analytics service responsible for log management such as record collecting agents, record aggregators, and the like, may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more computing devices of a network-accessible analytics service;
wherein the one or more computing devices of the network-accessible analytics service are configured to:
obtain a particular data record comprising one or more text terms, including a first text term;
apply a hashing-based function to at least the first text term to obtain a result;
select one or more entries of a first probabilistic data structure comprising at least one entry, of a plurality of entries of the data structure, that each represent a probabilistic occurrence of more than one text term, said select based on the result of the hashing-based function, wherein the first probabilistic data structure comprises a representation of a first plurality of data records, and wherein the one or more entries selected based on the result of said apply the hashing-based function to at least the first text term comprise a particular entry indicating a presence of a second text term;
update at least one entry of the one or more entries to indicate the presence of the first text term in the particular data record;
apply a dimensionality reduction algorithm on at least the updated first probabilistic data structure to produce reduced-dimension output;
generate, based on applying the reduced-dimension output as input to a similarity detection algorithm, an indication of a similarity between the particular data record and one or more other data records; and indicate, via a programmatic interface, the indication of similarity.

2. The system as recited in claim 1, wherein the one or more computing devices are configured to:

combine a second probabilistic data structure and a third probabilistic data structure, wherein the second probabilistic data structure comprises a representation of a second plurality of data records, and wherein the third probabilistic data structure comprises a representation of a third plurality of data records; and execute the dimensionality reduction algorithm on a result of the combination to obtain input for classification.

3. The system as recited in claim 2, wherein to combine the second probabilistic data structure and the third probabilistic data structure, the one or computing devices are configured to utilize one or more of: (a) a bit-level Boolean operation or (b) a vector instruction.

4. The system as recited in claim 1, wherein to apply the hashing-based function, the one or more computing devices are configured to:

obtain respective outputs of a plurality of hash functions.

5. The system as recited in claim 1, wherein the one or more computing devices are configured to:

determine a term-confusion threshold associated with analysis of at least the first plurality of data records; and select one or more parameters of the hashing-based function based at least in part on the term-confusion threshold.

6. A method, comprising:

performing, at one or more computing devices:

applying a mapping function to at least a first text term of a particular data record of a first plurality of data records;

selecting one or more entries of a first probabilistic data structure comprising at least one entry, of a plurality of entries of the data structure, that each represent a probabilistic frequency of more than one text term, said selecting based at least in part on the applying of the mapping function to the at least the first text term, wherein the first probabilistic data structure comprises a representation of the first plurality of data records, and wherein the one or more entries selected based at least in part on the applying the mapping function to at least the first text term comprise a particular entry indicating a presence of a second text term within at least one data record of the first plurality of data records;

updating at least one entry of the one or more entries to indicate a presence of the first text term in the particular data record; and generating, based at least in part on the first probabilistic data structure, an indication of a similarity between the particular data record and one or more other data records.

7. The method as recited in claim 6, further comprising performing, by the one or more computing devices:

combining the first probabilistic data structure and a second probabilistic data structure, wherein the second probabilistic data structure comprises a representation of a second plurality of data records, wherein the generating is associated with an unsupervised machine learning algorithm and is based at least in part on a result of said combining.

8. The method as recited in claim 7, wherein said combining comprises utilizing one or more of: (a) a bit-level Boolean operation or (b) a vector instruction.

9. The method as recited in claim 6, wherein said applying the mapping function comprises computing respective outputs of a plurality of hash functions.

10. The method as recited in claim 6, further comprising performing, by the one or more computing devices:

determining a term-confusion threshold associated with analysis of at least the first plurality of data records; and selecting one or more parameters of the mapping function based at least in part on the term-confusion threshold.

11. The method as recited in claim 6, wherein said generating uses an unsupervised machine learning algorithm that comprises a classification algorithm, further comprising performing, by the one or more computing devices:

utilizing the classification algorithm to identify member data records of a particular class of data records;

determining, based on an examination of the member data records, one or more representative text terms; and providing an indication that the one or more representative text terms are associated with the particular class of data records.

12. The method as recited in claim 6, wherein the generating uses one or more of: a principal component analysis algorithm, an independent component analysis algorithm, an information bottleneck algorithm, a locally linear embedding algorithm, a nonnegative matrix factorization algorithm, a probabilistic latent semantic analysis algorithm, or an artificial neural network algorithm.

13. The method as recited in claim 6, further comprising performing, by the one or more computing devices:

obtaining the particular data record from a log generated by one or more of: (a) an operating system, (b) a hypervisor, (c) a network intermediary device, (d) a monitoring service agent, or (e) a user-mode application.

14. The method as recited in claim 6, further comprising performing, by the one or more computing devices:

receiving a request to perform similarity analysis on the plurality of data records, wherein the request comprises a respective indication of one or more of (a) a source from which at least some data records of the plurality of data records are to be obtained, (b) a budget, (c) a permissible term-confusion threshold, or (d) a presentation preference for results.

15. The method as recited in claim 6, further comprising performing, by the one or more computing devices:

providing the indication of the similarity between the particular data record and one or more other data records to a client.

16. A non-transitory computer-accessible storage medium storing program instructions that when executed on one or more processors:

apply a mapping function to at least a first text term of a particular data record of a first plurality of data records;

select one or more entries of a first probabilistic data structure comprising at least one entry, of a plurality of entries of the data structure, that each represent a probabilistic occurrence of more than one text term, said select based at least in part on said apply the mapping function to at least the first text term, wherein the first probabilistic data structure comprises a representation of the first plurality of data records, and wherein the one or more entries selected based at least in part on said apply the mapping function to at least the first text term comprise a particular entry indicating a presence of a second text term within at least one data record;

update at least one entry of the one or more entries to indicate a presence of the first text term in the particular data record; and generate, based at least in part on the first probabilistic data structure, an indication of a similarity between the particular data record and one or more other data records.

17. The non-transitory computer-accessible storage medium as recited in claim 16, wherein the instructions when executed on the one or more processors:

combine the first probabilistic data structure and a second probabilistic data structure, wherein the second probabilistic data structure comprises a representation of a second plurality of data records.

18. The non-transitory computer-accessible storage medium as recited in claim 16, wherein to apply the mapping function, the instructions when executed on the one or more processors compute respective outputs of a plurality of hash functions.

19. The non-transitory computer-accessible storage medium as recited in claim 16, wherein the instructions when executed on the one or more processors:

determine a term-confusion threshold associated with analysis of at least the first plurality of data records; and select one or more parameters of the mapping function based at least in part on the term-confusion threshold.

20. The non-transitory computer-accessible storage medium as recited in claim 16, wherein the instructions when executed on the one or more processors:

utilize a classification algorithm to identify member data records of a particular class of data records;

determine, based on an examination of the member data records, one or more representative text terms; and provide an indication that the one or more representative text terms correspond to the particular class of data records.

* * * * *